United States Patent [19]

Keim

[11] Patent Number: 5,791,568

[45] Date of Patent: Aug. 11, 1998

[54] LEAF VACUUM/CHOPPER

[75] Inventor: Norbert Keim, Mühlacker, Germany

[73] Assignee: Adlus GmbH, Illertissen, Germany

[21] Appl. No.: 815,999

[22] Filed: Mar. 10, 1997

[30] Foreign Application Priority Data

Mar. 12, 1996 [DE] Germany ............ 196 09 569.7

[51] Int. Cl.$^6$ .................................................. B02C 18/06
[52] U.S. Cl. ................ 241/47; 241/56; 241/101.78; 241/291
[58] Field of Search .................. 241/47, 55, 56, 241/101.78, 291; 15/339, 344, 405

[56] References Cited

U.S. PATENT DOCUMENTS

| | | | |
|---|---|---|---|
| 3,968,938 | 7/1976 | Ruhl et al. | 241/101.78 X |
| 5,231,827 | 8/1993 | Connolly et al. | 241/101.78 X |
| 5,245,726 | 9/1993 | Rote et al. | 241/55 X |
| 5,294,063 | 3/1994 | Bote | 241/101.78 |
| 5,586,359 | 12/1996 | Iida | 241/56 X |
| 5,588,178 | 12/1996 | Liu | 241/55 X |
| 5,604,954 | 2/1997 | Webster et al. | 15/330 |
| 5,673,457 | 10/1997 | Webster et al. | 15/330 |

*Primary Examiner*—John M. Husar
*Attorney, Agent, or Firm*—Herbert Dubno; Andrew Wilford

[57] ABSTRACT

An apparatus for vacuuming up and chopping material such as leaves has a housing having a main chamber centered on an axis, an inlet port opening axially into the chamber, and an outlet port opening tangentially of the chamber. A rotor disk in the chamber centered on the axis has a hub at the axis and having an axially directed face provided with a predetermined number of radially and axially extending and angularly spaced vanes having outer edges. At least two and at most half of the vanes are provided on their outer edges with axially outwardly projecting chopper blades. A motor in the housing connected to the rotor disk at the hub rotates the disk about the axis and thereby draws the material in through the inlet, coarsely chops the material with the blades, and expels the coarsely chopped material with the vanes through the outlet port.

5 Claims, 4 Drawing Sheets

LEAF VACUUM/CHOPPER

FIELD OF THE INVENTION

The present invention relates to an apparatus for chopping leaves, lawn clippings, light refuse, and the like. More particularly this invention concerns such an apparatus that can also vacuum up the material being chopped.

BACKGROUND OF THE INVENTION

A standard apparatus for vacuuming up and chopping material such as leaves has a housing defining a main chamber centered on an axis, an inlet port opening axially into the chamber, and an outlet port opening tangentially of the chamber. A rotor disk in the chamber centered on the axis has a hub at the axis and an axially directed face provided with a plurality of radially and axially extending and angularly spaced vanes having outer edges. A motor in the housing connected to the rotor disk at the hub rotates the disk about the axis and thereby draws the material in through the inlet port and expels it through the outlet port.

As described in German patent document 3,836,748 it is known to form the rotor vanes as chopper blades that serve to comminute the material that is drawn in. Thus whole leaves and twigs, for example, are sucked in by the device and are ejected from it as smaller bits and chips, typically into a bag fitted over the outlet port.

The problem with this system is that the material includes pieces that cannot be chopped and that can become wedged between adjacent vanes. In other words, a piece of material like a chunk of wood that is not too big to fit through the inlet port is drawn in and gets caught between adjacent vanes. This creates an imbalance in the rotor, so that the entire machine vibrates excessively as the rotor turns. In addition this trapped material reduces the flow cross section of the device and, therefore, its capacity.

The solution to this problem is to space the vanes angularly fairly far apart. Thus any big chunks that get caught will be so heavy that centrifugal force will cause them to move outward. The disadvantage of this is, however, that the reduced number of vanes moves less air, reducing the suction effect. Thus a tradeoff is made between capacity and likelihood of jamming.

OBJECTS OF THE INVENTION

It is therefore an object of the present invention to provide an improved vacuum and chopping apparatus for material including leaves, grass clippings, and the like.

Another object is the provision of such an improved vacuum and chopping apparatus for material including leaves, grass clippings, and the like which overcomes the above-given disadvantages, that is which has a high throughput but that is not likely to jam.

SUMMARY OF THE INVENTION

An apparatus for vacuuming up and chopping material such as leaves has according to the invention a housing having a main chamber centered on an axis, an inlet port opening axially into the chamber, and an outlet port opening tangentially of the chamber. A rotor disk in the chamber centered on the axis has a hub at the axis and having an axially directed face provided with a predetermined number of radially and axially extending and angularly spaced vanes having outer edges. At least two and at most half of the vanes are provided on their outer edges with axially outwardly projecting chopper blades. A motor in the housing connected to the rotor disk at the hub rotates the disk about the axis and thereby draws the material in through the inlet, coarsely chops the material with the blades, and expels the coarsely chopped material with the vanes through the outlet port.

Thus according to the invention the sucked-in material is coarsely chopped by the blades before it gets to the more closely spaced vanes. The precomminution prevents any pieces that could jam the system or get between the vanes from getting to the vanes, so that this coarsely comminuted material can then be further comminuted by the more closely spaced vanes and then expelled from the outlet port. Thus the system has the advantages of a chopper but still has enough vanes to achieve good air flow and relatively fine chopping.

The blades according to the invention are formed as axial extensions of the respective vanes, unitary with the respective vanes. Alternately clips releasably secure the blades to the respective vanes.

In accordance with the invention the blades have straight outer edges meeting at a point at the axis. In addition the vanes have a predetermined radial dimension and the blades have a radial dimension equal to up to two-thirds of the radial dimension of the respective vanes.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
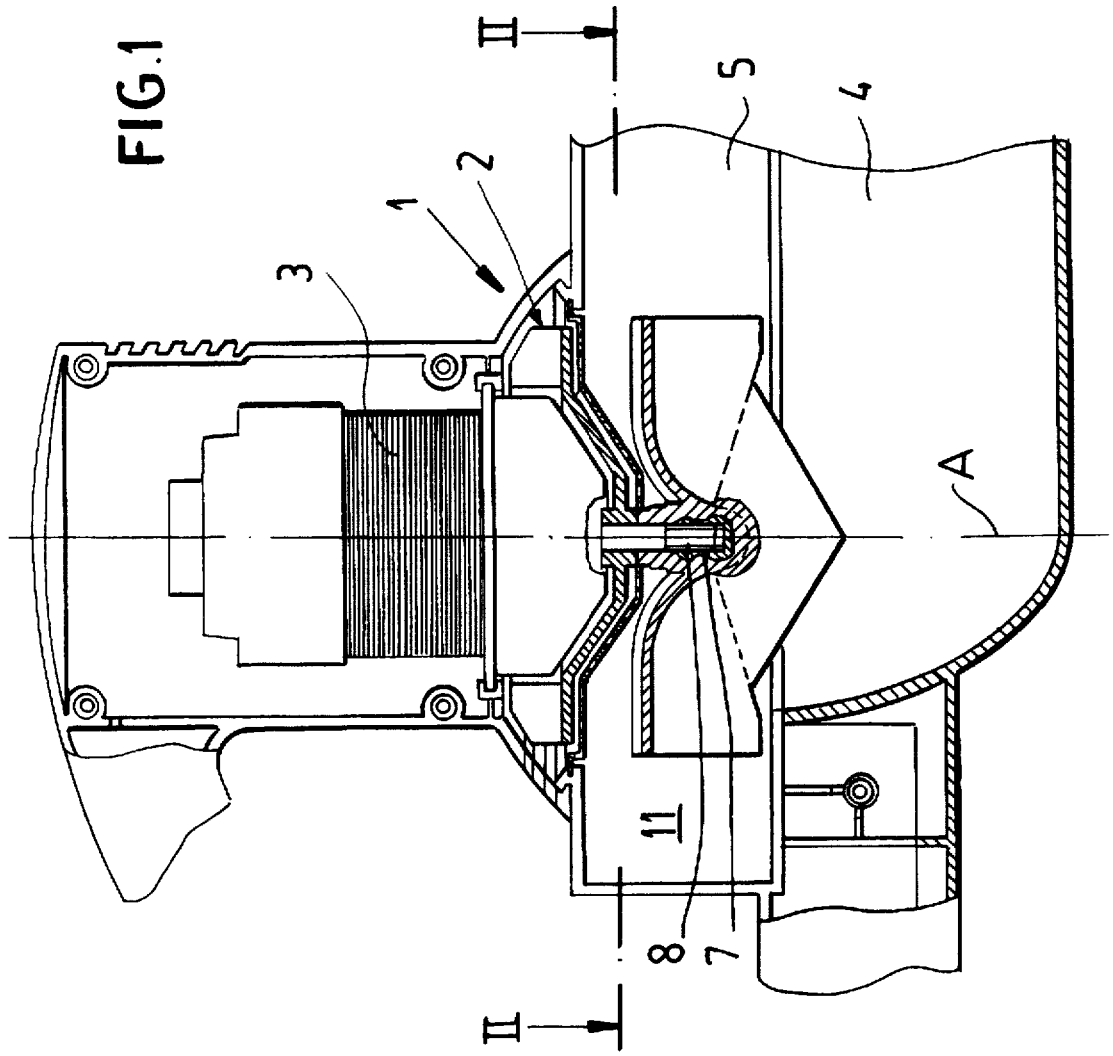
FIG. 1 is a vertical section through a vacuuming/chopping apparatus according to the invention.
Figure 2:
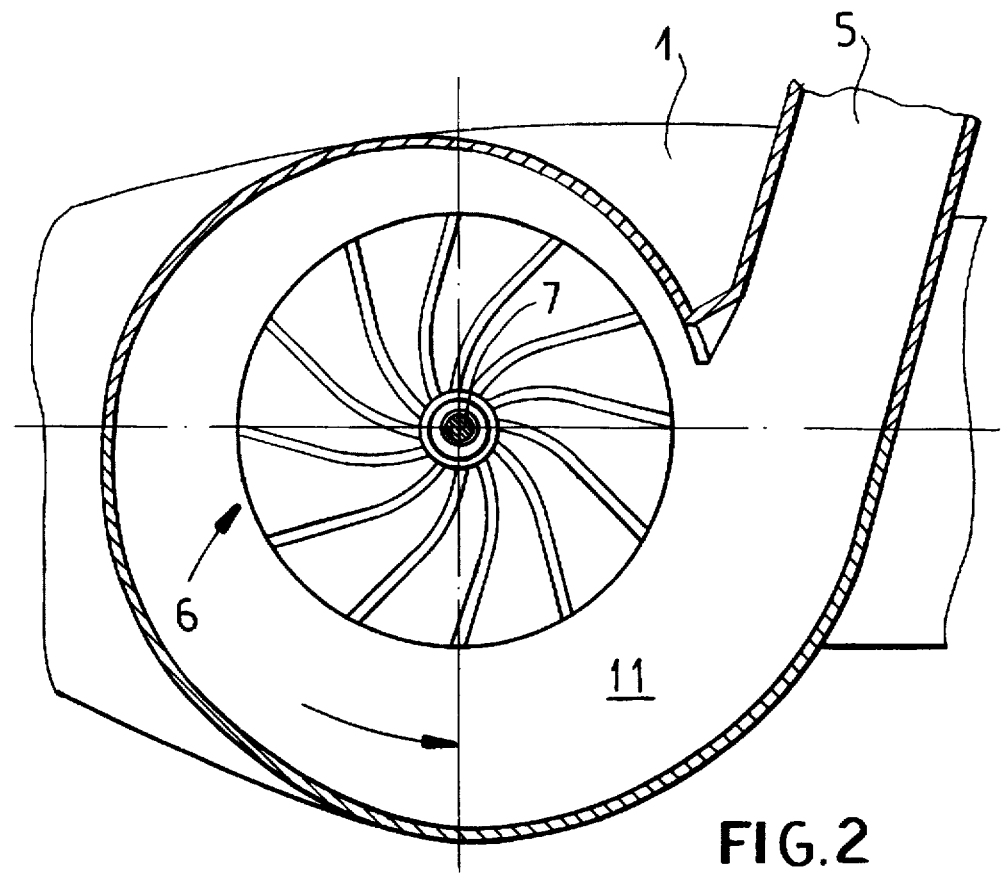
FIG. 2 is a section taken along line II—II of FIG. 1.

As seen in FIGS. 1 and 2 a leaf vacuum/chopper according to the invention has a housing 1 forming a main chamber 11 holding a rotor 2 that is rotated about an axis A by a motor 3. An inlet port 4 opens axially into the bottom of the chamber 11 and an outlet port 5 extends tangentially from the chamber 11 level with the rotor 2, as in a standard squirrel-cage fan.

Figure 4:
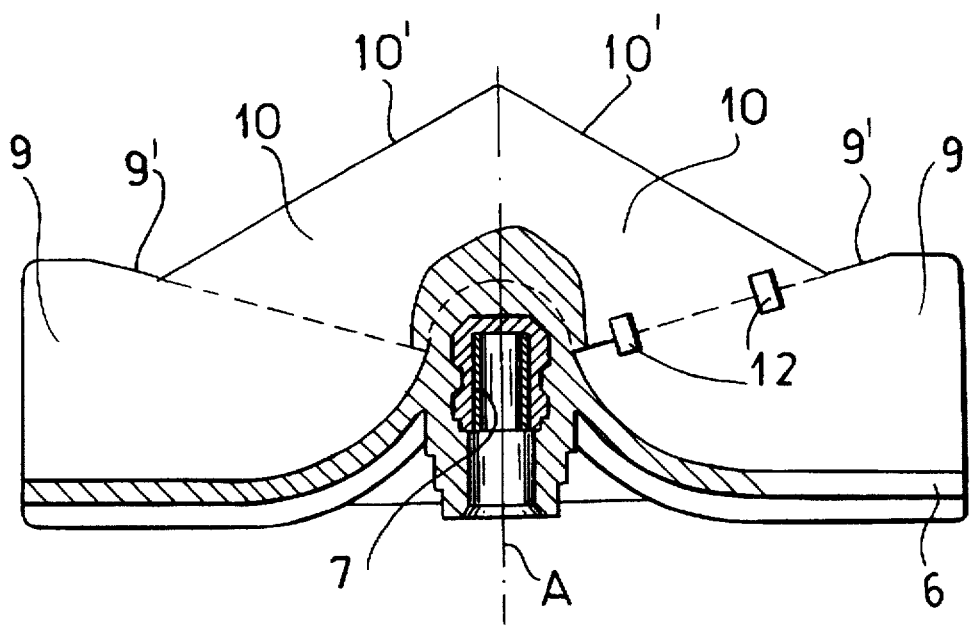
FIGS. 4 and 5 are axial sections taken along respective lines IV—IV and V—V of FIG. 3.
Figure 3:
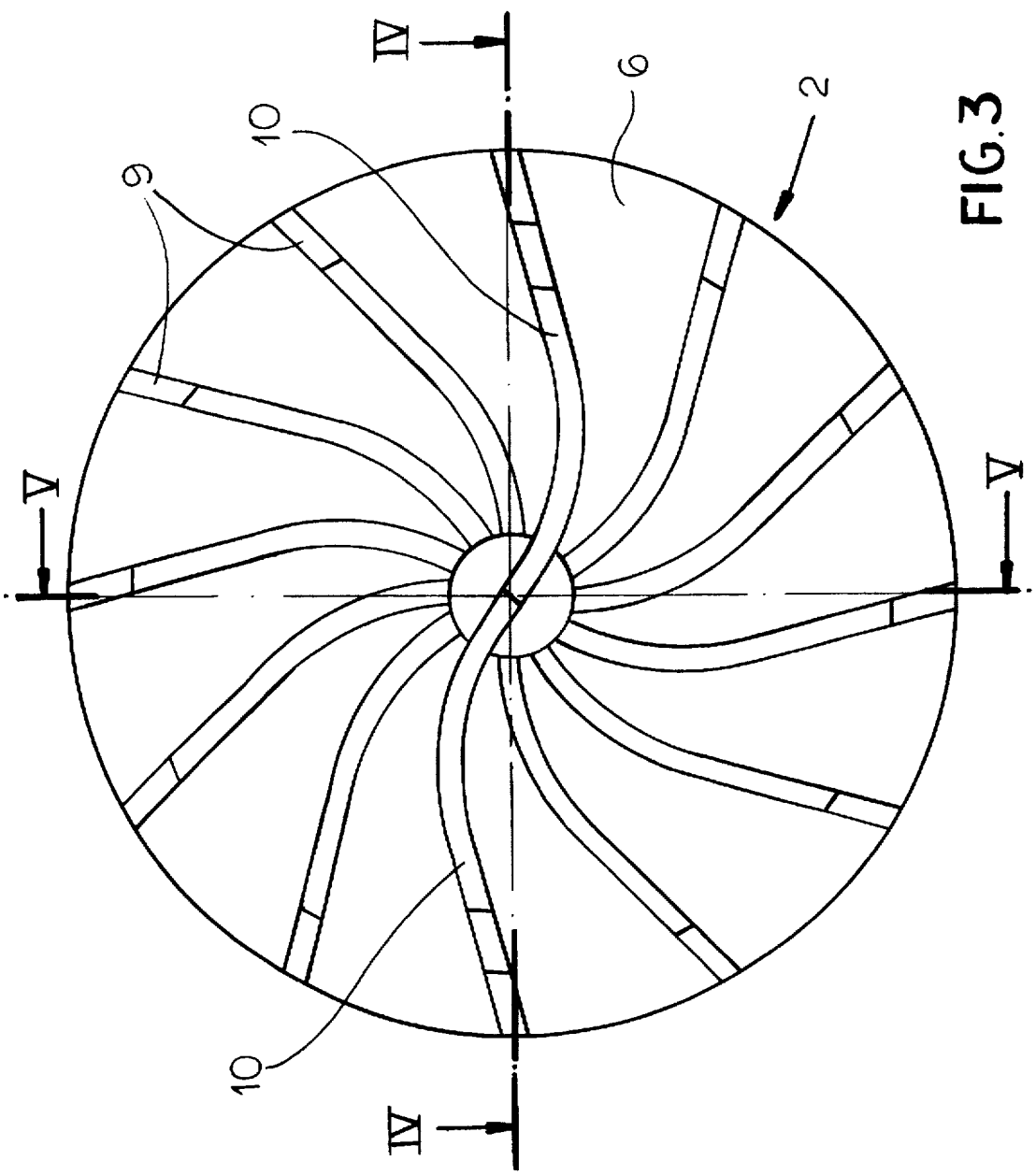
FIG. 3 is a bottom view of the rotor of this invention.
Figure 5:
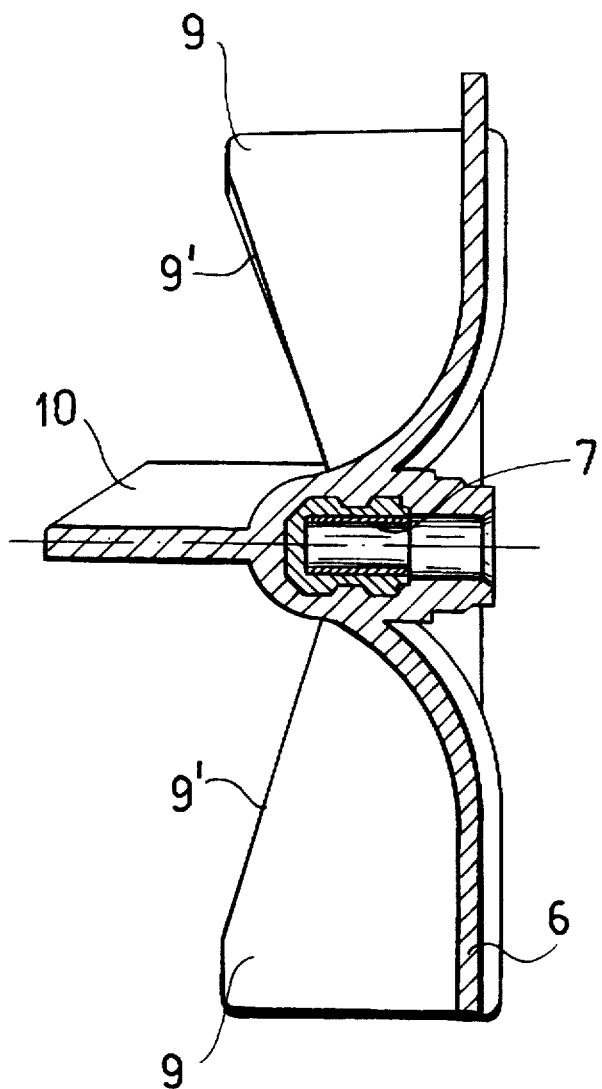

The rotor 2 as better shown in FIGS. 3 through 5 comprises a metallic disk 6 of circular outer periphery having a hub 7 seated at the axis A on an output shaft 8 of the motor 3. The lower face of this disk 6 that is turned toward the inlet port 4 is formed with twelve identical vanes 9 that are angularly equispaced and generally spiral-shaped, although they could also be straight and planar. They project axially downward and have outer edges 9' that are all identical.

According to the invention two of the vanes 9 have, outward of their edges 9', blades 10 that constitute axial extensions. As shown in FIG. 4 these blades 10 have straight outer edges 10' that are positioned well past the outer edges 9' of the blades 9 and that in fact meet at a point at the axis A. FIG. 4 shows on the right how one of the blades 10 can be a separate piece from the respective vane 9 and secured thereto releasably by respective small clips 12. The other blade 10 is formed as a unitary, one piece extension of the respective vane 9.

Thus material that is sucked into the chamber 11 through the port 4 will have to pass the blades 10 that will chop this material effectively. The chopped pieces will be then passed to the more closely spaced vanes 9 that will further comminute them and blow them tangentially out through the port 5. Since the blades 10 are widely spaced, they will not jam with material, and since there are six times more air-impelling blades 9 than coarse precomminuting cutter blades 10, strong air flow will be maintained.

I claim:

1. An apparatus for vacuuming up and chopping material such as leaves, the apparatus comprising:

a housing having a main chamber centered on an axis, an inlet port opening axially into the chamber, and an outlet port opening tangentially of the chamber;

a rotor disk in the chamber centered on the axis, having a hub at the axis, and having an axially directed face provided with a predetermined number of radially and axially extending and angularly spaced vanes having outer edges, at least two and at most half of the vanes being provided on their outer edges with axially outwardly projecting chopper blades having straight outer edges meeting at a point at the axis; and means including a motor in the housing connected to the rotor disk at the hub for rotating the disk about the axis and thereby drawing the material in through the inlet, coarsely chopping the material with the blades, and expelling the coarsely chopped material with the vanes through the outlet port.

2. The vacuuming/chopping apparatus defined in claim 1 wherein the blades are formed as axial extensions of the respective vanes.

3. The vacuuming/chopping apparatus defined in claim 2 wherein the blades are unitary with the respective vanes.

4. The vacuuming/chopping apparatus defined in claim 1, further comprising clips releasably securing the blades to the respective vanes.

5. The vacuuming/chopping apparatus defined in claim 1 wherein the vanes have a predetermined radial dimension and the blades have a radial dimension equal to up to two-thirds of the radial dimension of the respective vanes.

* * * * *